July 4, 1961 T. R. SMITH-MILLER 2,990,737
DEVICE FOR MOUNTING CHAINS ON VEHICLES
Filed Nov. 12, 1958 3 Sheets-Sheet 1
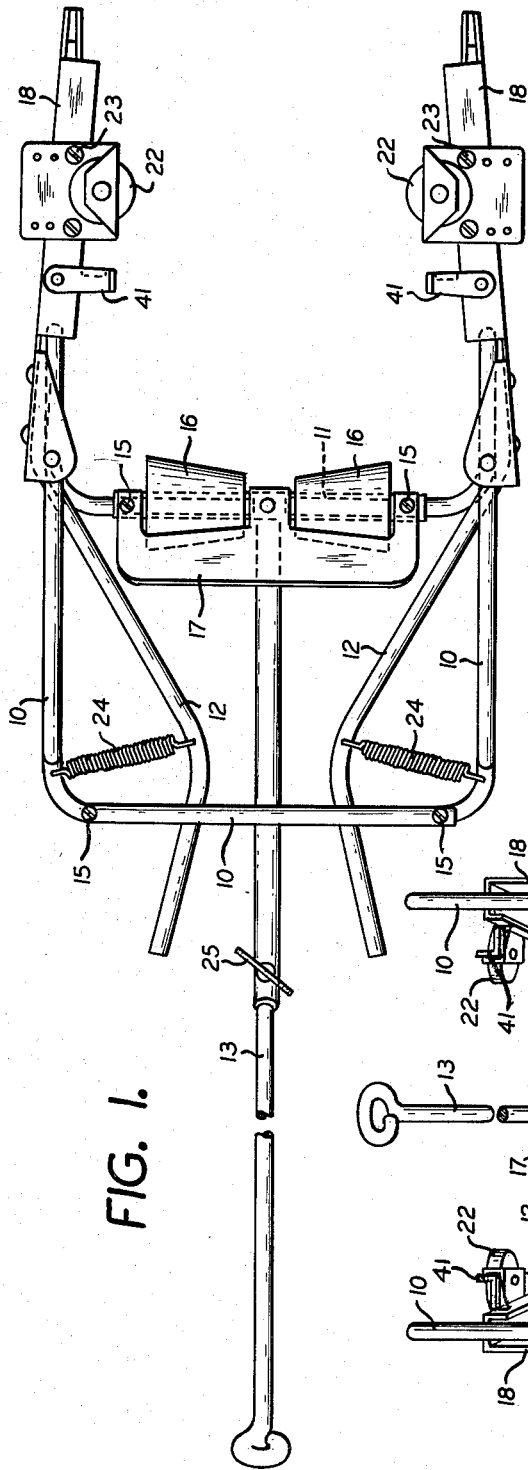
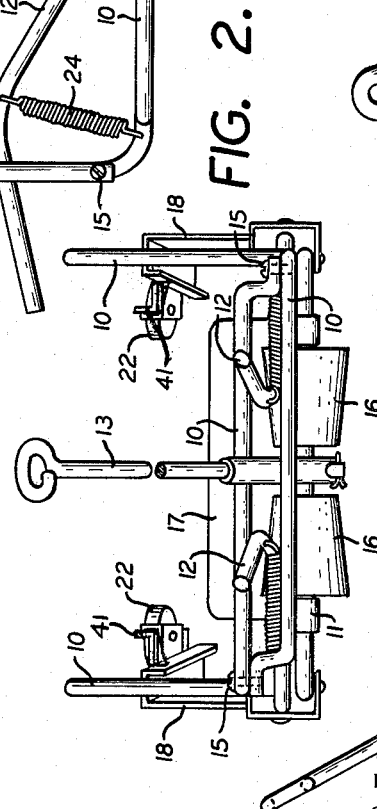
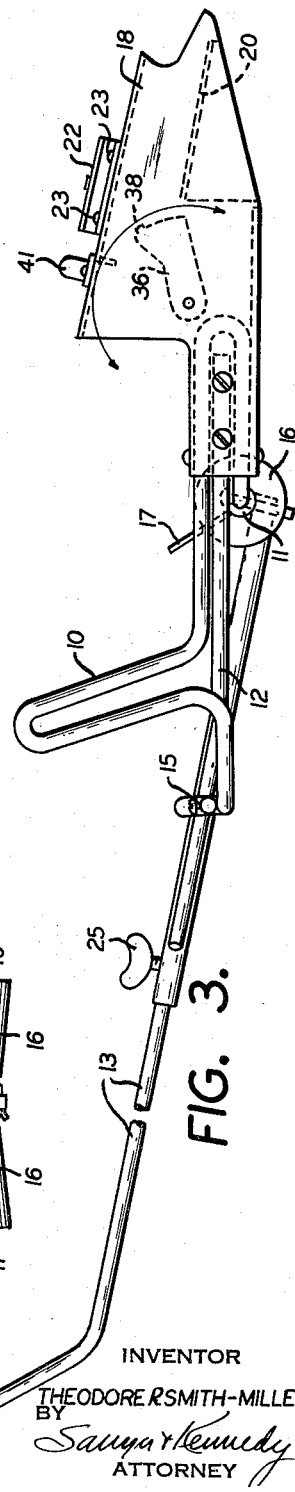
INVENTOR
THEODORE R SMITH-MILLER
BY
ATTORNEY July 4, 1961 T. R. SMITH-MILLER 2,990,737
DEVICE FOR MOUNTING CHAINS ON VEHICLES
Filed Nov. 12, 1958 3 Sheets-Sheet 2
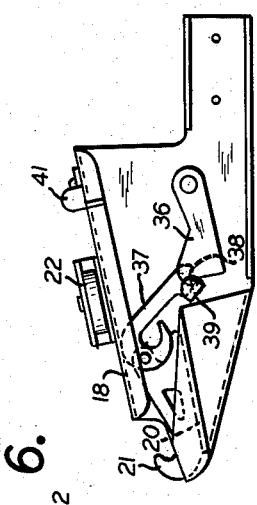
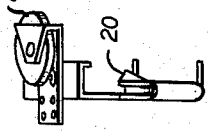
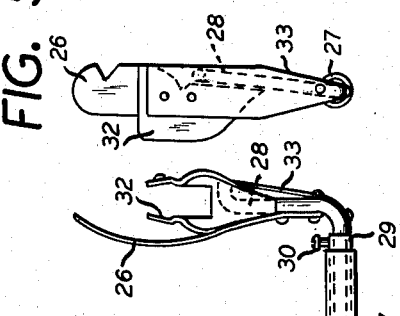
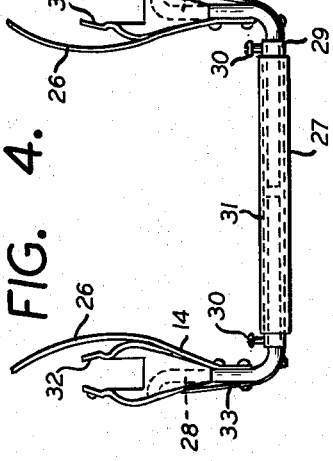
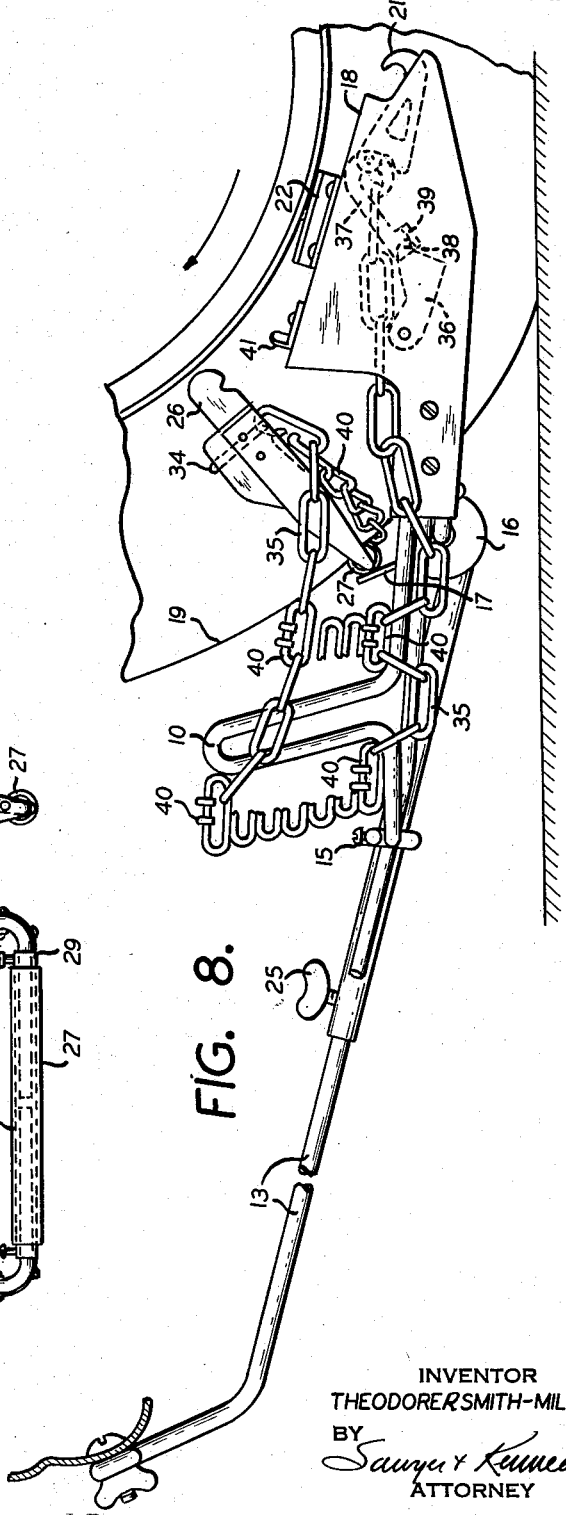
INVENTOR
THEODORE R. SMITH-MILLER
BY
Sawyer & Kennedy
ATTORNEY July 4, 1961   T. R. SMITH-MILLER   2,990,737
DEVICE FOR MOUNTING CHAINS ON VEHICLES
Filed Nov. 12, 1958   3 Sheets-Sheet 3

INVENTOR
THEODORE R. SMITH-MILLER
BY Sawyer + Kennedy
ATTORNEY

United States Patent Office 2,990,737
Patented July 4, 1961

2,990,737
DEVICE FOR MOUNTING CHAINS ON VEHICLES
Theodore R. Smith-Miller, R.F.D. 1, Mount Kisco, N.Y.
Filed Nov. 12, 1958, Ser. No. 773,403
3 Claims. (Cl. 81—15.8)

This invention relates to tire chains for automobiles and is more particularly concerned with a device for the easy mounting of tire chains upon the wheel of an automobile.

In the mounting of tire chains upon the wheels of the standard automobile, the driver of the vehicle must lift the wheel so that the chains can be fitted and locked in position. When the wheels have been raised, the mounting of the chains on the wheels and locking the chains in place requires the driver to sprawl on the ground or roadway in order to reach the inside of the tire to lock the chains together. Mounting chains while on the roadway is both dangerous and likely to soil the clothes, and it is very inconvenient.

It is the object of this invention to produce a device for the easy mounting of the tire chains on the tire of a vehicle, eliminating the need to raise the wheels by a jack, and for the operator to crawl on the road to attach the locks on the chains on the inside of the wheel.

The device of this invention is a small handy tool which may be carried in the trunk of the vehicle and ready for use at any time. This device is also easy to manufacture and operate and can be made readily available for all motorists.

Other objects of this invention will be obvious as the description of the device and the operation are given hereafter.

Figure 9:
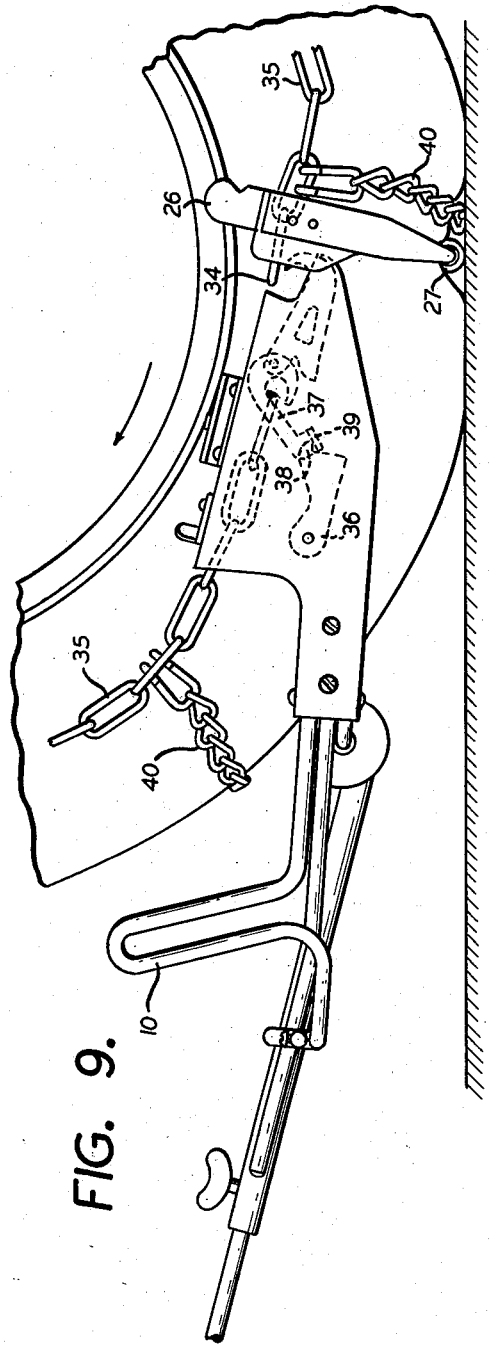
Figure 10:
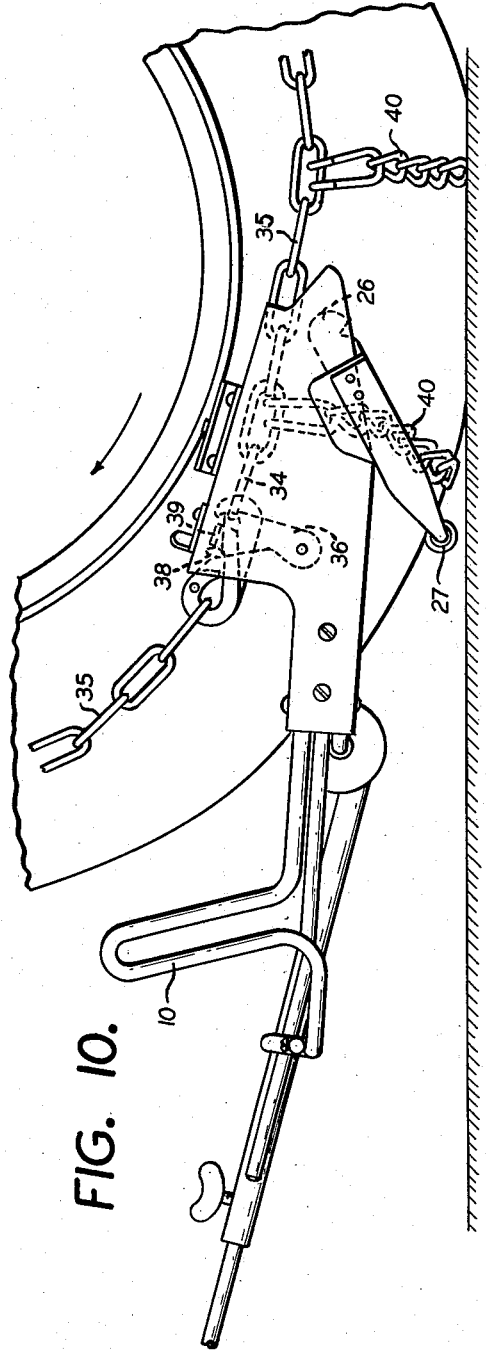

For a better understanding of this invention, reference is made to the drawings in which:

FIGURE 1 is a fragmentary plan view of the device;
FIGURE 2 is an end elevational view of the device;
FIGURE 3 is a fragmentary side elevational view of the device;
FIGURE 4 is an end elevational view of the clamp of the device;
FIGURE 5 is a side view of the clamp shown in FIGURE 4;
FIGURE 6 is an end elevation of a detail showing the chain locking portion receptacle and guide roller;
FIGURE 7 is a side elevation of the same;
FIGURE 8 is a side elevational fragmentary view showing the chain ready for mounting on the tire;
FIGURE 9 is a side elevational fragmentary view showing the chain mounted on the tire before it is linked in position; and
FIGURE 10 is a side elevational fragmentary view showing the chain linked and locked in position.

Referring to the drawings, the device of this invention consists of a frame 10, having a shaft 11, a pair of pivoted arms 12, a bumper arm 13 and a detachable tire clamp 14.

The frame 10 is generally the shape of the letter U, and is adjustable laterally to accommodate to tires of different sizes by increasing or decreasing the spacing between the pivoted arms 12. The screws 15 are employed to fix the adjusted width of the frame.

The shaft 11 in the form as shown in FIGURE 1 is a tube or a pipe slidably connecting both sides of the frame and supporting a pair of rollers 16 rotatably mounted on the shaft and within the frame. A divider plate 17 secured to the shaft fits around the rollers 16 so that the rollers may rotate freely on the shaft. The rollers, in the form as shown, are preferably in the form of truncated cones with the wider portions at the outside so that the rollers will bear against the tread of the tire and maintain the frame centered and in the same relative position to the tire when the wheel is rotated.

Each of the two pivoted arms 12, mounted on the frame 10, has a receptacle 18 which is supported next to the side walls of the tire 19. Each of the receptacles has a channel 20 on the inside thereof and facing the tire, and each channel holds one of the chain locking portions 21 of the tire chain 35, as shown in FIGURE 8. The receptacles have a pair of rollers 22, rotatably mounted at the top thereof, which rollers bear against the tihre walls and support the device on the tire. These rollers can be adjusted to different positions on the receptacles to accommodate the distance of the receptacle to the side of the tire in tires of different profiles. Screws 23 fix the position of the rollers on the receptacles.

The pivoted arms 12 have springs 24 at one of their ends, which springs are attached to the arms at one end thereof and at the other end to the frame 10 as shown in FIGURE 1. Thus, when the arms are pulled together at one end, the receptacles are pulled or spread apart at the other end to allow the tire to be positioned between the receptacles 18, and when the arms are released, the rollers 22 press against the sides of the tire.

The bumper arm 13, which is preferably pivoted at one end to the shaft 11, is adapted to be fastened at the other end to the rear bumper of the vehicle, to hold the device in fixed position in relation to the vehicle and the wheel where the chains are to be mounted. The bumper arm in the form shown is built in two parts, one of which slidably fits over the other, so that its length may be adjusted and held in the adjusted position. For this purpose, a thumb screw 25 in the outer part of the arm is provided, so that it can be tightened against the inner part, when the desired length has been ascertained.

The detachable tire clamp 14, which is preferably U shaped as shown in FIGURE 4, has a pair of clamping arms 26, and a cross-piece assembly 27. The clamping arms are advantageously of flexible material, such as spring steel, and are fastened to the inside of the side pieces 28, which are slidably fitted into the inner pipe 29 of the cross-piece assembly 27, so that the distance between the clamping arms may be adjusted to accommodate tires of different widths. Screws 30 are employed to hold the side pieces in fixed position, when the adjusted space between the tire clamps has been ascertained. The outer tube 31 of the cross-piece fits over the inner pipe 29, and is free to rotate independently of the inner pipe and the side pieces.

Chain grips 32 are flexibly mounted by straps 33 on the side pieces 28 of the tire clamp to permit lateral movement. The chain grips are adapted to hold the end links 34 at the end of the chain 35 opposite that including the chain locking portions 21 in fixed position.

To operate the device of this invention, the traction chain 35 is placed upon the device by sliding the chain locking portions 21 at one end of the chain into the channels 20 of the receptacles 18, as shown in FIGURES 7 and 8, and then bringing the pivoted latch 36, mounted in the side of each receptacle 18, over the arm 37 of the corresponding chain locking portion until the catches 38 stop against the locking tongs 39 of the chain locking arms. The cross links 40 of the chain 35 are then folded on the frame 10 as shown in FIGURE 8.

The tire clamp 14 is then mounted on the frame 10 by pulling the clamping arms apart so that the spring actions of the arms 26 press against the pivoted brackets 41 located on the upper part of the receptacles 18. The cross-piece assembly 27 of the tire clamp will then rest against the divider plate 17 and over the rollers 16.

The end links 34 of the tire chain are then fitted into the corresponding chain grips 32 by forcing the end links into the grips. After the chain has been placed on the device and the end links are held in position in the chain grips, the device is ready to be installed on the tire of the vehicle.

To install the device on the tire, it is necessary to grasp the bumper arm 13 with one hand, and to grasp and pull together the ends of the pivoted arms 12 with the other hand, and then to position the device against the rear side of the tire on a rear wheel, allowing the rollers 22 to guide the device into position by riding against both sides of the tire until the cross-piece assembly 27 of the tire clamp is forced against the tire tread by the divider plate 17.

When the device has been attached to the tire, the pivoted arms 12 are released so that the side walls of the tire force the clamping arms of the tire clamp apart, disengaging the clamping arms from the pivoted brackets, and allowing the clamping arms of the tire clamp to hold securely to the tire. The bumper arm is then fixed to the rear bumper by a conventional thumb screw, and the device is in position to operate.

When the device is in place as above, the wheel is rotated slowly by driving the car forward. The rotation of the wheel carries the tire clamp holding the end links of the chain around the wheel, and the tire clamp lifts the chain and cross-links from the frame until the chain is mounted on the tire and the chain grips meet the receptacles holding the chain locking portions as shown in FIGURE 9. The laterally flexible connection of the chain grips permits the alignment of the end links with the corresponding locking portions located in the channels of the receptacles, as the chain grips are forced against the pointed ends of the receptacles.

The cross-piece of the tire clamp is wedged between the ground and the tire by the weight of the vehicle while the receptacles move ahead with the vehicle, thus causing the chain grips to move or pivot downwards under the pointed ends of the receptacles as shown in FIGURE 10, and the hooked ends of the chain locking portions slide within the chain grips and are inserted into the end links of the chain.

This downward movement of the chain grips in turn forces the clamping arms of the tire clamp to slide off the sidewalls of the tire.

The chain having been linked together rotates with the tire, pulling the chain locking portions along in the channels and away from the pointed ends of the receptacles in which they were originally set. The motion forces the locking arms 37 of the chain locking portions against the pivoted latches 36, and as the locking arms are pulled away by the chain, the tongs 39 of the locking arms engage the catches 38, thus lifting the pivoted latches 36.

The pivoting of the latches carries the locking arms upwards until the locking portions are locked in place by the tongs 39 of the locking arms 37, and the pivoted latches continue to rotate on their pivots until they disengage from the chain locking portions.

After the chains have been locked together as above, the device is removed from the tire by disengaging the bumper arm from the bumper, and grasping the pivoted arms to open the receptacles apart and become free of the chain.

When the device has been removed, the chain will be fitted and locked securely on the tire, and the chain locking portions on both sides of the chain will be locked over the corresponding end links of the chain.

Having described my invention, I claim:

1. A device for mounting tire chains having chain locking portions at one end on tires of a vehicle comprising a tire clamp having a pair of clamping arms connected together by a cross piece, means on the clamping arms for holding the other end of said tire chain in fixed position and for carrying the tire chain over the tire when the tire is rotated, a frame having a pair of side members and a cross bar, said tire clamp adapted to contact the side members of said frame when rotated with the tire, means bearing against the side members to open said side members, a bumper arm attached to the frame and adapted to be fastened to the bumper of the vehicle, a roller rotatably mounted on said cross bar and in a position to bear against the tread of the tire, a pair of chain receptacles mounted on the side members of the frame, said chain receptacles having a channel to carry the chain locking portions therein, a pair of rollers mounted on the chain receptacles and adapted to bear against the side walls of the tire to support the chain receptacles adjacent the side walls of the tire when the tire is rotated, means forming the ends of said receptacles for placing the end links of the tire chain into locking engagement with the chain locking portions, and means for closing the chain locking portions over the end links of the tire chain.

2. A device for mounting tire chains having chain locking portions at one end on tires of a vehicle comprising a tire clamp having a pair of clamping arms adjustably connected together, means on the clamping arms for holding the other end of said tire chain in fixed position and for carrying the tire chains over the tire when the tire is rotated, a frame having a pair of pivoted side arms and connected together by cross bar, said tire clamp adapted to contact the side arms of said frame when rotated with the tire, means for forcing said side arms apart to engage the sidewalls of the tire, means extending from said frame adapted to engage a portion of said vehicle so as to hold the frame in a fixed position relative to the vehicle, a roller rotatably mounted on the cross bar adapted to bear against the tread of the tire, chain receptacles mounted on the side arms and having channels to carry the chain locking portions at said one end of the chain, means on said receptacles bearing against the side walls of the tire to support the receptacles along the side walls of the tire when the tire is rotated, means forming the ends of said receptacles for placing the end links of the tire chain into locking engagement with the chain locking portions, and means for closing the chain locking portions over the end links of the tire chains.

3. A device for mounting tire chains having chain locking portions at one end on the tires of a vehicle comprising a tire clamp having a pair of clamping arms bearing against the side walls of the tire, means on the clamping arms for holding the other end of said tire chain in fixed position in relation to the tire and for carrying said tire chain over the tire when the tire is rotated, a frame having a pair of side members, said tire clamp adapted to contact the side members of said frame when rotated with the tire, means for manually adjusting the distance between the side members, means extending from said frame adapted to engage a portion of said vehicle so as to hold the frame in a fixed position relative to the vehicle, rollers rotatably mounted on said side members adapted to bear against the side walls of the tire to support the side members along the side walls of the tire when the tire is rotated, said frame having a cross bar connecting said side members, a roller rotatably mounted on said cross bar to bear against the tread of the tire, said side members having channels therein to carry the chain locking portions at said one end of the chain, means forming the ends of said receptacles for causing the chain locking portions to hook the end links of the chain held by the clamping arms, after the tire clamp has carried the chain around the tire, and pivotal means mounted on the side members for closing the chain locking portions over the end links of the tire chain.

References Cited in the file of this patent

UNITED STATES PATENTS

| | | |
|---|---|---|
| 2,213,910 | Higgins et al. | Sept. 3, 1940 |
| 2,576,302 | Lutz | Nov. 27, 1951 |
| 2,768,545 | Bertelsen | Oct. 30, 1956 |